Feb. 4, 1969  E. O. SCHONSTEDT  3,426,269
MAGNETIC FIELD SENSOR INCLUDING MEANS TO
MINIMIZE PERMANENT MAGNETIZATION
Filed Nov. 12, 1965

INVENTOR
ERICK O. SCHONSTEDT
BY
ATTORNEY

United States Patent Office 3,426,269
Patented Feb. 4, 1969

3,426,269
MAGNETIC FIELD SENSOR INCLUDING MEANS
TO MINIMIZE PERMANENT MAGNETIZATION
Erick O. Schonstedt, 9170 Brookville Road,
Silver Spring, Md. 20910
Filed Nov. 12, 1965, Ser. No. 507,325
U.S. Cl. 324—43　　　　　　　　　　　　　4 Claims
Int. Cl. G01r 33/02; H01f 27/28

ABSTRACT OF THE DISCLOSURE

Means for applying additional cyclical magnetizing fields to the ends of a magnetic field sensor of the type having a toroidal winding through which the cyclical magnetizing current is passed. The additional cyclical magnetic fields applied to the ends of the core reduce the susceptibility of the core to become permanently magnetized.

---

This invention relates to magnetic measuring devices for use in the field of magnetometers and flux responsive measuring instruments, and consists more particularly in new and useful improvements in an assembly of the general type shown and described in my prior Patent No. 2,981,885, issued Apr. 25, 1961.

Briefly, the magnetic core and winding assembly of my said prior patent comprises a nonmagnetic, hollow, cylindrical form having a pair of superposed, oppositely wound, coaxial coils of permeable, magnetic material interwoven on the outside thereof, and a plurality of turns of wire wrapped longitudinally over and threaded through said form to provide an excitation winding. This wound form was enclosed within a second nonmagnetic form which supported an additional winding with turns substantially perpendicular to the turns of said longitudinal windings, providing a signal pickup winding. The arrangement was such that the flux due to the earth's field would be "shaken" or cyclically reversed by the alternating flux produced by the excitation coil along the helical paths of the interwoven strips of permeable magnetic material, tending to prevent permanent magnetization.

The object of the present invention is to provide an improved assembly which will more effectively act to eliminate the tendency of the magnetic material of the core to become permanently magnetized under certain conditions, such as being subjected to magnetic fields substantially stronger than the earth's field.

Another object is to provide an assembly which will obtain the "shaking" effect described in said prior patent, without adding unwanted signals in the signal pickup winding.

A further object of the invention is to provide a unique and improved core and winding assembly.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Briefly, this invention contemplates the use of a highly permeable magnetic core having an axis along which magnetic field intensities may be measured by reason of the magnetic effects produced by an alternating magnetic field applied perpendicular to the axis. In this invention, small alternating magnetic fields are applied also at the ends of the core and parallel to said axis, so as to materially reduce the tendency of the magnetic core to become permanently magnetized.

Figure 1:
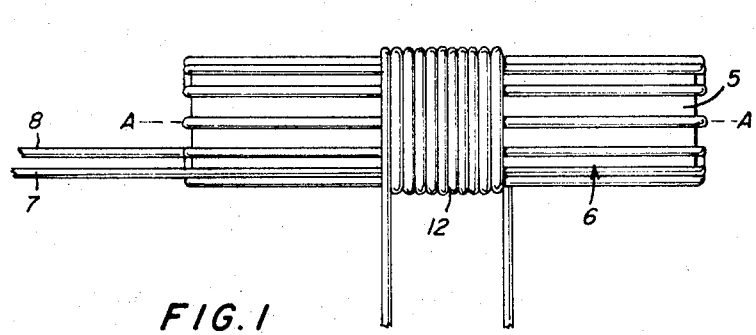
FIG. 1 is a diagrammatic illustration for purposes of orientation, showing the basic active elements embodied in my said prior patent.
Figure 2:
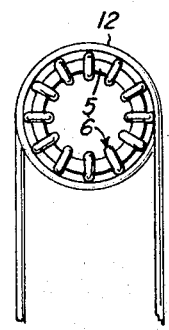
FIG. 2 is a diagrammatic end view of the core shown in FIG. 1.

As background, referring first to FIG. 1 of the drawings, 5 represents a magnetic core which is in the form of a hollow cylinder of highly permeable magnetic material, as in my said prior patent. A coil of wire 6 is toroidally wound about the hollow cylinder, and a signal pickup winding 12 is wound annularly about the core 5 and coil 6, perpendicular to the axis of the core. Line A—A represents the axis along which the magnetic field intensities are measured by the device in conjunction with ancillary parts and apparatus not shown.

An alternating current is passed through the winding 6 having leads 7 and 8, and the alternating magnetic field associated with this current is of sufficient magnitude to drive the core 5 periodically into saturation. This alternating magnetic field is applied in a plane perpendicular to the axis A—A.

Any weak magnetic field, such as a component of the earth's magnetic field, applied along axis A–A will result in the generation in signal pickup winding 12 of voltages which are of the second-harmonic frequency of the alternating current passed through winding 6.

As pointed out in my prior patent, the core 5 in the arrangement here illustrated in FIG. 1, if constructed of a simple hollow cylinder, will have a tendency to become permanently magnetized. This tendency is greatly reduced by the arrangement disclosed in said prior patent, by constructing the core 5 from two interwoven strips of highly permeable magnetic material, such as Permalloy.

Figure 3:
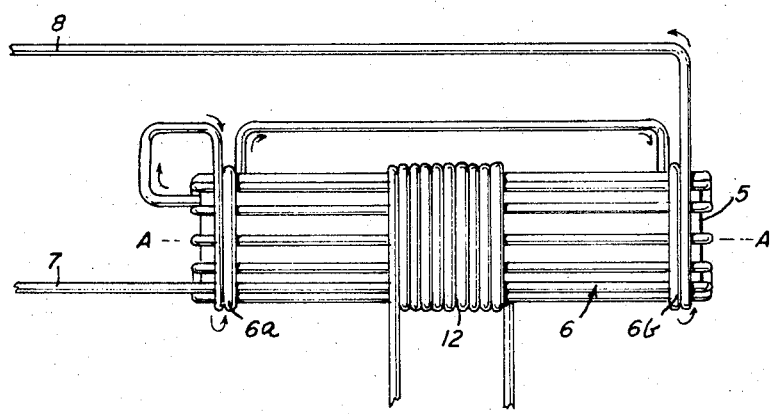
FIG. 3 is a diagrammatic illustration of the present invention.

It has been found that a further reduction in the tendency of the core to perm is achieved by applying a small amount of alternating magnetic field parallel to line A—A at the ends of the core 5, and the means for appying this field is the subject of the present invention and diagrammatically illustrated in FIG. 3. Here it will be seen that the end of lead 8 of the coil 6 is wound over the ends of the core 5 to form coils 6a and 6b, which are preferably wound in opposite directions with respect to each other. In this arrangement, components of the magnetic field produced by the alternating current existing in coil 6, will be applied along axis A—A at the ends of the core. The field generated in coil 6a will be oppositely directed to that generated in coil 6b, due to the fact that the coils are wound in opposite directions. Because the fields produced by coils 6a and 6b are oppositely directed, no significant signals will be generated in signal pickup winding 12 due to the existence of coils 6a and 6b.

The fields produced by coils 6a and 6b produce shaking effects on the ends of the core 5 so as to reduce the tendency of the core to become permanently magnetized. It may be pointed out that while these coils 6a and 6b are shown and referred to as being wound in opposite directions, they may be wound in the same direction and reduce the tendency of the core to perm. However, in so doing, some fundamental frequency signals are generated in the pickup winding which must be eliminated by the amplifier circuits which process the signal. It is therefore preferable to wind these coils in opposite directions.

It may be pointed out that there is an optimum number of turns for the end coils 6a and 6b, and if this optimum number is exceeded, the tendency to perm increases from that achieved under optimum conditions. For example, it has been found that eight windings at these points produce successful results, while more than eight cause a tendency to perm, increasing with the number of added turns.

Some slight difference in resistance to perm is achieved depending upon whether coils $6a$ and $6b$ are formed from the lead 7 or lead 8 of coil 6. Which of the individual arrangements is best for a particular assembly would have to be determined by tests. As a practical matter, coils $6a$ and $6b$ are wound separately from coil 6 and all of the leads of the coils are brought out to a terminal block (not shown) where the leads can be interconnected, as required to obtain optimum performance.

While the core 5 is illustrated as a hollow tubular form, as in my prior patent, the core may consist of a permeable magnetic wire or filament through which an alternating current is passed to create an alternating magnetizing field.

From the foregoing, it is believed that the invention may be readily understood by those skilled in the art without further description, it being borne in mind that numerous changes may be made in the details disclosed without departing from the spirit of the invention as set forth in the following claims.

I claim:
1. A magnetic field sensor comprising a tubular core of permeable magnetic material, a first electrical conductor toroidally wound longitudinally through and about said core, a continuation of said first conductor being annularly wound about at least one end of said core at substantially right angles to said toroidal winding to form a magnetizing coil, a second electrical conductor annularly wound around the core coaxial with said magnetizing coil forming a pickup winding, and means for passing an alternating current through said first conductor to cyclically drive said magnetic core into saturation, said magnetizing coil applying additional alternating magnetic fields to at least one end of said core, whereby said second conductor may be connected to a means for detecting harmonic voltages generated in the core due to the magnetization of the core by a magnetic field to be measured.

2. A magnetic field sensor as claimed in claim 1, including magnetizing coils wound about both ends of said core.

3. A magnetic field sensor as claimed in claim 2, wherein said magnetizing coils are respectively formed by integral extensions of said first electrical conductor.

4. A magnetic field sensor as claimed in claim 2, wherein said magnetizing coils are respectively wound in opposite directions with respect to one another.

References Cited
UNITED STATES PATENTS 3,071,699   1/1963   Eckl et al. _____ 324—41

RUDOLPH V. ROLINEC, *Primary Examiner.*

R. J. CORCORAN, *Assistant Examiner.*

U.S. Cl. X.R.

336—229